A. T. HALLOCK.
FIRELESS COOKER.
APPLICATION FILED JAN. 11, 1910.

975,416.

Patented Nov. 15, 1910.

Witnesses
H. O. Van Antwerp
Minnie Johnson

Inventor
Arthur T. Hallock
By Luther V. Moulton
Attorney

UNITED STATES PATENT OFFICE.

ARTHUR T. HALLOCK, OF GRAND RAPIDS, MICHIGAN, ASSIGNOR TO COOKERETTE COMPANY, OF MUSKEGON, MICHIGAN, A CORPORATION OF MICHIGAN.

FIRELESS COOKER.

975,416.  Specification of Letters Patent.  Patented Nov. 15, 1910.

Application filed January 11, 1910. Serial No. 537,431.

*To all whom it may concern:*

Be it known that I, ARTHUR T. HALLOCK, a citizen of the United States of America, residing at Grand Rapids, in the county of Kent and State of Michigan, have invented certain new and useful Improvements in Fireless Cookers; and I do hereby declare the following to be a full, clear, and exact description of the invention, such as will enable others skilled in the art to which it appertains to make and use the same.

My invention relates to improvements in fireless cookers and its object is to provide a device wherein the fixed lining thereof is not exposed to the vapors arising from the food, and to provide the device with various new and useful features hereinafter more fully described and particularly pointed out in the claims.

Heretofore fireless cookers having metallic linings being exposed to the vapors arising from the food are liable to become rusted by the action of such vapors and also require frequent cleaning in order to keep them from becoming foul smelling due to the decomposition of the vapors condensed thereon. By my improved construction the vapors escaping from the food are not permitted to escape into the interior of the cooker and the same is thus kept clean and sweet, and not rusted or otherwise injured.

Figure 1:
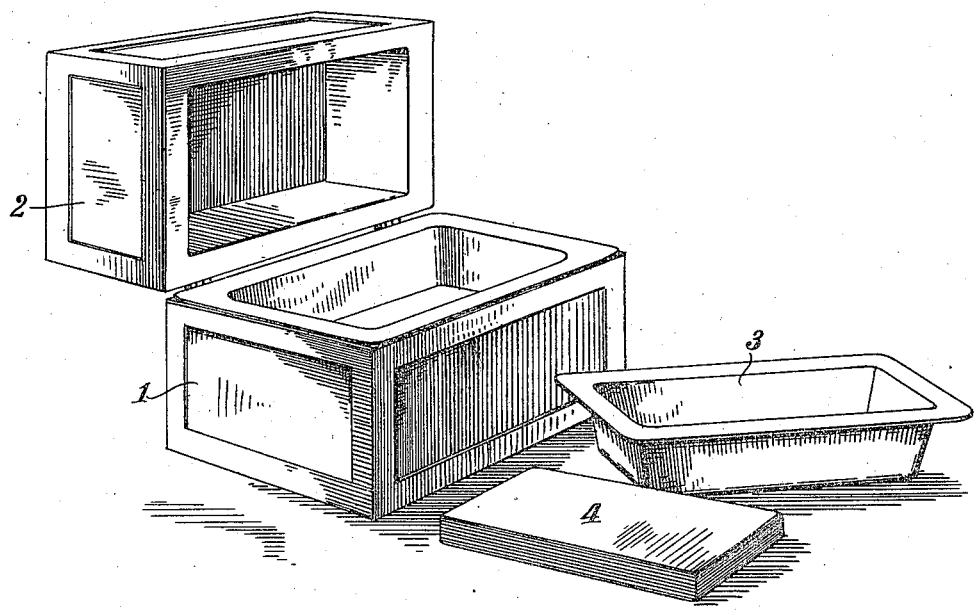
Figure 2:
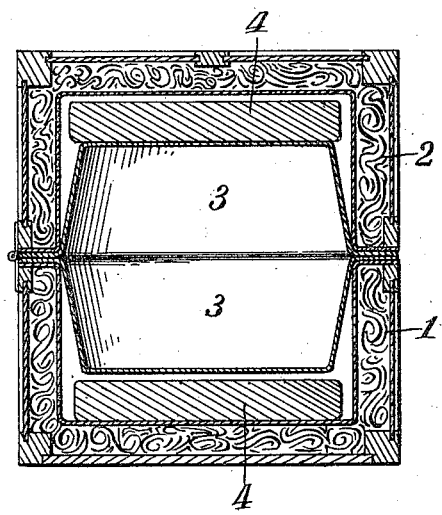
Figure 3:
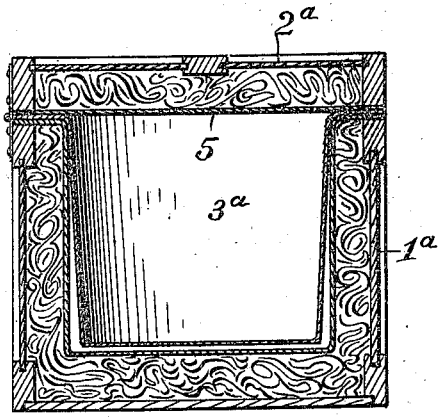

My device consists essentially of a removable inner vessel to contain the food to be cooked, preferably of stamped and seamless sheet metal, and having an outwardly extended flange, which when in place for use extends through the seam between the body of the case and the cover of the same to the outside thereof, whereby the escaping vapors from the food escape wholly outside of the case between these outwardly extended flanges and are wholly prevented from entering the interior of the case, as will more fully appear by reference to the accompanying drawings, in which:

Figure 1 is a perspective of a device embodying my invention, the same being opened and with the removable inner vessel and heater removed therefrom; Fig. 2 is a transverse vertical section of the device arranged as a baker, wherein food may be baked or dry heat applied thereto; and, Fig. 3 a transverse vertical section of a modification of the same.

Like numbers refer to like parts in all of the figures.

1 represents the case and 2 the cover of the same, which in the preferred form are of substantially equal dimensions, the chamber therein being substantially one-half in each. This case and cover are preferably hinged to each other and spaced apart a slight distance to permit the flanges of the removable inner vessels to extend therebetween.

3 are the inner vessels preferably of seamless stamped sheet aluminum having outwardly extended flanges adapted to extend between the case 1 and cover 2 to the outside of the same. In the preferred form these vessels are substantially duplicates, and used in reverse relation. The same may be said of the case and cover.

In the modified form the chamber is wholly within the case 1$^a$ and the cover is flat, the lining 5 thereof being a flat sheet extending wholly to the outside of the case and having its outline conforming to the outline of the top flange of the vessel 3$^a$, which is removably within the case.

The operation of this device is substantially the same as the form shown in Figs. 1 and 2, the vapors escaping between the flange of the vessel 3$^a$ and the margin of the cover lining. This lining being flat is easily cleaned without removal from the cover, but can be left detachable if preferred.

4 represents any suitable heater used when the device is operated as a baker.

What I claim is:

1. A fireless cooker, comprising a case and cover, and a removable vessel within the case provided with a flange extending through the seam between the case and cover.

2. A fireless cooker comprising a case, a cover for the case, a fixed lining for the case, and a removable inner vessel in the case having a flange extending through the seam between the case and cover.

3. A fireless cooker, comprising two substantially equal parts forming the case and cover and provided with fixed linings, and two detached removable vessels being substantially duplicates and each having a flange extending through the seam between
5 the case and cover, whereby vapors from the food are discharged outside of the case and cover.

In testimony whereof I affix my signature in presence of two witnesses.

ARTHUR T. HALLOCK.

Witneses:
GEORGIANA CHACE,
MINNIE JOHNSON.